June 23, 1925.
A. E. FALOR ET AL
1,543,283
NONSTICKING LINER FOR SHEET RUBBER
Filed Dec. 19, 1921
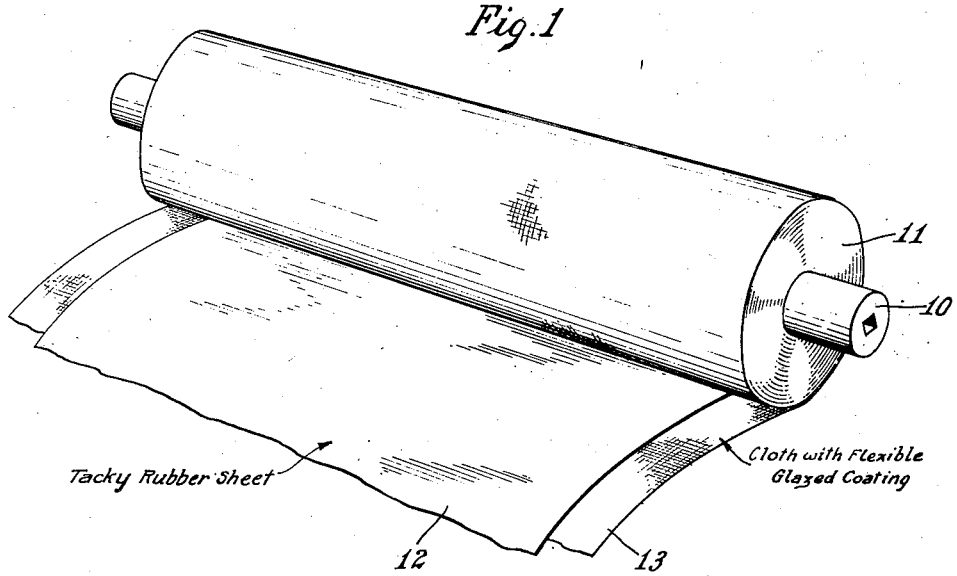
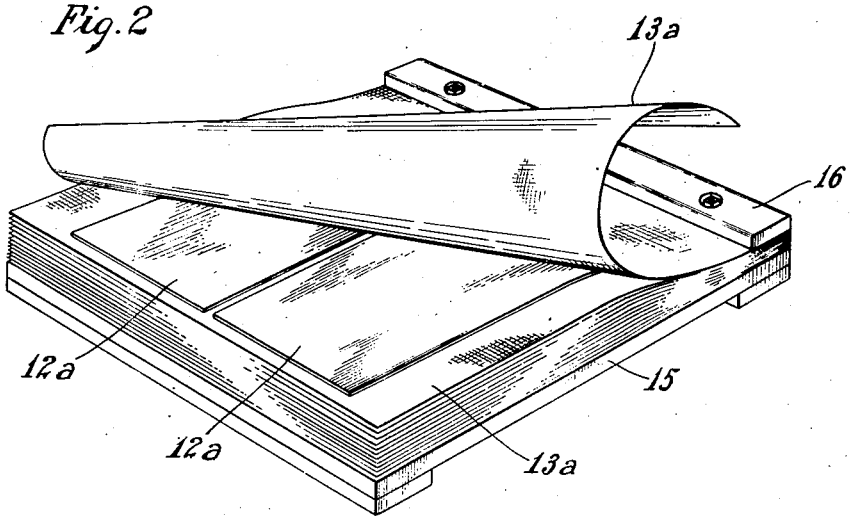
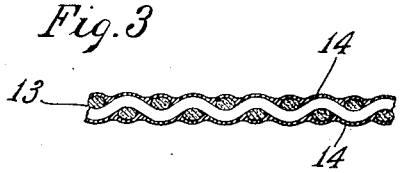
Inventors
Abram E. Falor
John B. Dickson
Fred H. Amon
By Robert M. Pierson, Atty.

Patented June 23, 1925.

1,543,283

UNITED STATES PATENT OFFICE.

ABRAM E. FALOR, JOHN B. DICKSON, AND FRED H. AMON, OF AKRON, OHIO, ASSIGNORS TO THE B. F. GOODRICH COMPANY, OF NEW YORK, N. Y., A CORPORATION OF NEW YORK.

NONSTICKING LINER FOR SHEET RUBBER.

Application filed December 19, 1921. Serial No. 523,431.

*To all whom it may concern:*

Be it known that we, ABRAM E. FALOR, JOHN B. DICKSON, and FRED H. AMON, citizens of the United States, residing at Akron, in the county of Summit and State of Ohio, have invented a certain new and useful Nonsticking Liner for Sheet Rubber, of which the following is a specification.

This invention relates to liners for use in the handling, storage and transporting of sheets of tacky rubber compound, frictioned fabric, etc., to prevent them from adhering to other pieces of rubber or other adjacent objects until such time as the tacky sheets are put to use, an example being the use of cloth liners and sheet rubber or rubberized fabric in the form of rolls or "books" in rubber factories.

Ordinary cotton cloth is the material almost universally used heretofore for this purpose, mainly because it combines in a greater degree than other materials the qualities of flexibility and durability, which are necessary under most of the conditions in which such liners are used, but it has been found that untreated cloth, while fairly suitable for the purpose if the tacky sheets are not to be kept in contact therewith for any great length of time, cannot be successfully used, for example, if sheets of raw rubber compound are mounted on the liner for a considerable period, especially if subjected to pressure in large, heavy rolls, as in that case the viscosity of the rubber is such that it will tend to flow and fill the interstices of the fabric, often times even penetrating entirely through the meshes, in which event both the sheet rubber and the fabric are rendered useless; or even with somewhat less penetration, the adhesion becomes so intimate that the tacky sheet cannot be successfully removed. Furthermore, as the liners are used over and over, they tend to absorb and retain a considerable amount of rubber which in time renders them more or less unsuitable.

These and other disadvantages have led to attempts to provide a substitute for plain cotton cloth for liners, usually in the form of such cloth treated with surfacing or impregnating materials, but prior to our invention no suitable "dope" for this purpose has been discovered, so far as we are aware.

Our invention has for its principal object to provide a liner which can be used with tacky rubber or rubberized sheets, either as a roll or a book, or in other ways, and which will more especially combine a high degree of flexibility with a non-sticking and durable surface, although in special instances flexibility may be less important and a considerable degree of stiffness may be desirable, as in book leaves, aprons, etc., used in rubber factories.

Of the accompanying drawings, Fig. 1 is a perspective view of a sheet-rubber and liner roll embodying our invention.

Fig. 2 is a perspective view of a book of tacky rubber sheets and liner leaves.

Fig. 3 is an enlarged section of the coated cloth liner with the thickness of the coating somewhat exaggerated.

Referring at first to Fig. 1, 10 is a shaft and 11 is a roll body thereon whose convolutions are made up of alternate layers of tacky sheet rubber or rubberized fabric, such as friction fabric, 12, and cloth liner 13, consisting preferably of square-woven cotton cloth coated on both sides with a composition which we have found will impart to the cloth the necessary qualities. The surface coating is shown at 14 in Fig. 3, and it will be observed that while it fills and closes the meshes of the cloth, it is preferably not spread thereon in so great a quantity as to form a perfectly flat surface, but rather the coating has high and low spots conforming to the weave of the fabric. This wavy or pebbled surface contributes to the partial pocketing of air between the tacky sheet 12 and the low spots in the liner surface, and thus decreases the adhesion between the rubber and the liner, the impervious nature of the coating preventing the air from escaping into the fibrous threads as it does in an untreated cloth liner.

In Fig. 2 is shown a book comprising an ordinary board backing 15, an edge clamping strip 16, and leaves 13ª of treated cloth, one of which is shown turned back, and sheets 12ª of tacky surfaced rubber or rubberized fabric interposed between the book leaves.

The composition we prefer to use has as its base an organic non-tacky, non-oxidizing film-forming or glazing substance such as pyroxylin, and this is given the necessary flexibility by the addition of a softener such as a blown vegetable oil or castor oil Suitable compositions for hard and soft dopes respectively are as follows, in parts by weight:

|  | Soft dope | Hard dope |
|---|---|---|
| Pyroxylin | 8 | 12 |
| Blended blown oil softener | 24 | 12 |
| Mixed solvent (ethyl acetate 10) (denatured alcohol 7) (benzol 21) | 68 | 78 |

The pyroxylin or cellulose nitrate may be in the form of washed moving-picture film scrap. A suitable softener is the material sold under the trade name of "Pierco Blended Oil."

This composition, either in the soft or hard form, is applied to the cloth by ordinary spreading methods and allowed to dry by evaporation of the solvent. When dry it presents a glazed surface which is not in itself tacky and is, at the same time, so highly flexible that the treated liner may be almost as flexible as the untreated cloth, and if applied, for example, relatively thin and without fillers, the liner will not permanently wrinkle or crack and will run true in passing through a calender.

For ordinary uses, such as liners for cord tire fabric, body fabric, etc., we prefer to apply on each side of the cotton cloth one coat of soft dope and two coats of hard dope, but the exact number may vary with the nature of the fabric and with the use to which the liner is put. For the leaves of books such as shown in Fig. 2, it is desirable to stiffen the fabric so that the leaves may be turned more easily, and in this case we prefer to use a greater number of coats, together with a filler such as china clay.

It will be understood that the materials and proportions given in the foregoing example are subject to some variation. While we prefer to employ a pyroxylin base, it is possible to use other film-forming materials. The softener should be of a nature to dissolve the pyroxylin or other film-forming substance, and while blown vegetable oils are suitable, castor oil may, for example, be used as an equivalent. For the described ingredients of the mixed solvent, we may substitute any suitable equivalents such, for instance, as acetone, methyl alcohol and gasoline.

We are aware that varnishes or lacquers including pyroxylin and an oil softener have been employed as impregnating and coating substances to make waterproof fabrics, artificial leather and the like, but so far as we aware no one prior to our invention has proposed to make use of such substances in producing a non-sticking liner for unvulcanized rubber or other tacky material.

We claim:

1. The combination of an article having a sticky surface of the nature of unvulcanized rubber, and a separable liner thereon comprising woven fabric coated with a composition forming a non-tacky, glazed surface, in contact with the sticky surface, having substantially the hardness and flexibility of oil-softened pyroxylin.

2. The combination of an article having a tacky rubber surface and a protective covering thereon, said covering comprising a flexible, fibrous sheet faced with an adherent, rubber-contacting film composed in substantial part of a cellulose ester and having a flexibility approximating that of said fibrous sheet.

3. The combination of sheet-material having a tacky rubber surface, and a separable, protective, flexible liner thereon surfaced with pyroxylin combined with a softener.

4. The combination of tacky sheet-rubber, and a liner thereon comprising woven cotton fabric coated with non-tacky, oil-softened pyroxylin.

5. The combination of tacky sheet-rubber, and a liner thereon comprising woven fabric glazed with a preparation essentially composed of pyroxylin and a vegetable oil softener.

6. The combination of an article having a tacky rubber surface and a separable protective covering thereon, said covering comprising, in contact with the rubber surface, a layer composed of an amorphous, non-tacky, organic, non-oxidizing substance having substantially the hardness and flexibility of oil-softened pyroxylin, said layer being formed with a multiplicity of air-pocketing depressions on its rubber-contacting face.

7. The combination of an article having a tacky rubber surface and a separable protective covering thereon, said covering comprising a flexible, fibrous sheet faced with an adherent, rubber-contacting film composed essentially of a cellulose ester and having a flexibility approximating that of the said fibrous sheet, said film being formed with a multiplicity of air-pocketing depressions on its rubber-contacting face.

8. The combination of sheet-material having a tacky rubber surface, and a liner thereon having a non-tacky, oil-softened, pyroxylin coating with an air-pocketing surface conforming to the weave of the fabric.

9. A protective liner for tacky sheet-material comprising woven fabric glazed with oil-softened pyroxylin having an air-pocketing surface conforming to the weave of the fabric.

10. A protective liner for sheet material having a tacky-rubber surface, said liner comprising a foundation sheet coated with a composition forming a non-tacky, glazed surface having substantially the hardness and flexibility of oil-softened pyroxylin, said composition being stiffened with a comminuted, mineral filler.

11. A protective liner for tacky sheet-material comprising fabric coated with pyroxylin combined with a softener and a comminuted mineral filler.

In witness whereof we have hereunto set our hands this 17 day of December, 1921.

ABRAM E. FALOR.
JOHN B. DICKSON.
FRED H. AMON.